(12) United States Patent
Croxford

(10) Patent No.: US 10,846,551 B2
(45) Date of Patent: Nov. 24, 2020

(54) VIDEO DATA PROCESSING

(71) Applicant: Apical Limited, Cambridge (GB)

(72) Inventor: Daren Croxford, Swaffham Prior (GB)

(73) Assignee: Apical Limited, Cambridge (GB)

( * ) Notice: Subject to any disclaimer, the term of this patent is extended or adjusted under 35 U.S.C. 154(b) by 108 days.

(21) Appl. No.: 16/269,056

(22) Filed: Feb. 6, 2019

(65) Prior Publication Data

US 2020/0250454 A1 Aug. 6, 2020

(51) Int. Cl.
*G06K 9/36* (2006.01)
*G06K 9/32* (2006.01)
*G06K 9/00* (2006.01)
*H04N 19/167* (2014.01)
*H04N 19/80* (2014.01)
*H04N 19/117* (2014.01)

(52) U.S. Cl.
CPC ....... *G06K 9/3233* (2013.01); *G06K 9/00744* (2013.01); *H04N 19/117* (2014.11); *H04N 19/167* (2014.11); *H04N 19/80* (2014.11)

(58) Field of Classification Search
CPC .... G06K 9/3233; G06K 9/00744; H04N 7/50; H04N 7/30; H04N 7/26313; H04N 7/26106; H04N 7/26244; H04N 7/26335; H04N 7/26271
See application file for complete search history.

(56) References Cited

U.S. PATENT DOCUMENTS

| 7,721,964 | B2 * | 5/2010 | Reichenbach | G01B 11/00 235/454 |
| 8,705,615 | B1 * | 4/2014 | Jones | H04N 19/59 375/240.01 |
| 8,774,266 | B2 * | 7/2014 | Wang | H04N 21/234327 375/240.01 |
| 9,007,057 | B2 * | 4/2015 | Villaret | G01D 5/145 324/207.25 |
| 9,373,016 | B2 * | 6/2016 | Canini | G06K 7/10732 |
| 9,411,042 | B2 * | 8/2016 | Brady | G06T 11/003 |
| 10,229,301 | B2 * | 3/2019 | Cumoli | B65G 15/00 |
| 10,408,610 | B1 * | 9/2019 | Bernard | G01B 11/24 |
| 10,515,246 | B2 * | 12/2019 | Fernandez-Dorado | G06K 7/10722 |
| 2012/0213409 | A1 * | 8/2012 | El-Maleh | H04N 19/46 382/103 |

* cited by examiner

*Primary Examiner* — Amir Alavi
(74) *Attorney, Agent, or Firm* — EIP US LLP

(57) ABSTRACT

A method for processing video data, which includes generating, with an image sensor of an imaging device, input data representative of input frames, and generating, at the imaging device, corresponding output video data by encoding regions of interest within the input frames in accordance with a different encoding scheme to the remaining regions within the input frames. The regions of interest within the input frames are designated by region of interest data that is received at the imaging device. Also disclosed is a video processing system, including an imaging device having an image sensor and a sensor data processor, and a computing system having at least one processor. The sensor data processor generates output data based on input data from the image sensor, by encoding regions of interest, as identified by data received from the computing system, with a different encoding scheme, and outputs such data to the computing system.

20 Claims, 5 Drawing Sheets

VIDEO DATA PROCESSING

BACKGROUND OF THE INVENTION

Technical Field

The present invention relates to methods and apparatus for processing video data representative of a video.

Processing video data may be energy intensive, generating considerable amounts of heat and, in battery-powered devices, quickly exhausting battery life, especially with high frequency and/or high definition video. Processing video data may also require or consume a large amount of bandwidth to transfer video data between different processes, with such transferring of video data also potentially being energy intensive, again, especially with high frequency and/or high definition video. It is desirable to improve the energy efficiency and/or lessen the bandwidth demands of video processing.

SUMMARY

According to an aspect of the present disclosure, there is provided a method for processing video data, comprising: generating, with an image sensor of an imaging device, input video data representative of a plurality of successive input frames; receiving, at the imaging device, first region of interest data, defining one or more regions of interest; generating, at the imaging device, output video data, which is based on the input video data, including by: in response to receiving said first region of interest data, selecting one or more first input frames from the plurality of input frames represented in the input video data; and for a given one of the selected one or more first input frames: encoding, in accordance with a first encoding scheme, a portion of the input video data that is representative of one or more regions of interest within the given first frame, thus generating first encoded data, the one or more regions of interest within the given first frame corresponding to said regions of interest defined by the first region of interest data, and encoding, in accordance with a second, different encoding scheme, a portion of the input video data that is representative of one or more remaining regions within the given first frame, thus generating second encoded data; and outputting, from the imaging device, said output video data, wherein the output video data comprises the first and second encoded data for each of the first one or more input frames.

According to another aspect of the present disclosure, there is provided a video processing system comprising: an imaging device, which comprises: an image sensor, which is configured to generate input video data representative of a plurality of successive input frames, at least one sensor data processor, and storage accessible by the at least one sensor data processor; a computing system, which comprises: at least one processor, and storage accessible by the at least one sensor data processor; and a data exchange interface, which connects the computing system and the image sensor; wherein instructions are stored on said storage accessible by the at least one sensor data processor that, when executed by the at least one sensor data processor, cause the at least one sensor data processor to: receive said input video data from the image sensor, receive, from the at least one processor of the computing system, via said data exchange interface, first region of interest data that defines one or more regions of interest, and generate output video data, which is based on the input video data, including by: in response to receiving said first region of interest data, selecting one or more input frames, and, for a given one of the selected one or more of input frames: encoding, in accordance with a first encoding scheme, a portion of the input video data that is representative of one or more regions of interest within the given selected frame, thus generating first encoded data, the one or more regions of interest within the given selected frame corresponding to said regions of interest defined by the first region of interest data, and encoding, in accordance with a second, different encoding scheme, a portion of the input video data that is representative of one or more remaining regions of interest within the selected frame in question, thus generating second encoded data, output said output video data to the computing system, via said data exchange interface.

According a further aspect of the present disclosure, there is provided an imaging device, which comprises: an image sensor, which is configured to generate input video data representative of a plurality of successive input frames; at least one sensor data processor; storage accessible by the at least one sensor data processor; and at least one connector connectable to a computing system, so as to provide a data exchange interface therebetween; wherein instructions are stored on said storage accessible by the at least one sensor data processor that, when executed by the at least one sensor data processor, cause the at least one sensor data processor to: receive said input video data from the image sensor, receive, from the at least one processor of the computing system, via said at least one connector, first region of interest data that defines one or more regions of interest, and generate output video data, which is based on the input video data, including by: in response to receiving said first region of interest data, selecting one or more input frames, and for a given one of the selected one or more of input frames: encoding, in accordance with a first encoding scheme, a portion of the input video data that is representative of one or more regions of interest within the given selected frame, thus generating first encoded data, the one or more regions of interest within the given selected frame corresponding to said regions of interest defined by the first region of interest data, and encoding, in accordance with a second, different encoding scheme, a portion of the input video data that is representative of one or more remaining regions of interest within the selected frame in question, thus generating second encoded data, output said output video data to the computing system, via said at least one connector.

BRIEF DESCRIPTION OF THE DRAWINGS

Further features will become apparent from the following description, given by way of example only, which is made with reference to the accompanying drawings, in which.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Processing video data may be energy intensive, generating considerable amounts of heat and, in battery-powered devices, quickly exhausting battery life, especially with high frequency and/or high definition video. Processing video data may also require or consume a large amount of bandwidth to transfer video data between different processes, with such transferring of video data also potentially being energy intensive, again, especially with high frequency and/or high definition video.

Methods described in accordance with embodiments of this disclosure generate, at an imaging device, output video data by encoding regions of interest within input frames (represented in input video data, which is generated by an image sensor of the imaging device) in accordance with a different encoding scheme to the remaining regions within the input frames. The regions of interest within the input frames are designated by region of interest data, which originates externally of the imaging device. Such methods allow the data for the portions of the frame that have greater significance—the regions of interest—to be encoded according to a scheme appropriate to their greater significance, with the remaining regions being encoded using a different scheme, appropriate to their lower significance. Such an approach may lessen the processing burden of processes that act upon the output data (e.g. downstream processes within an imaging pipeline) and/or may reduce the amount of data flowing within an imaging pipeline at a relatively upstream point, thus reducing heat generation associated with transferring data between processes in the pipeline.

Figure 1:
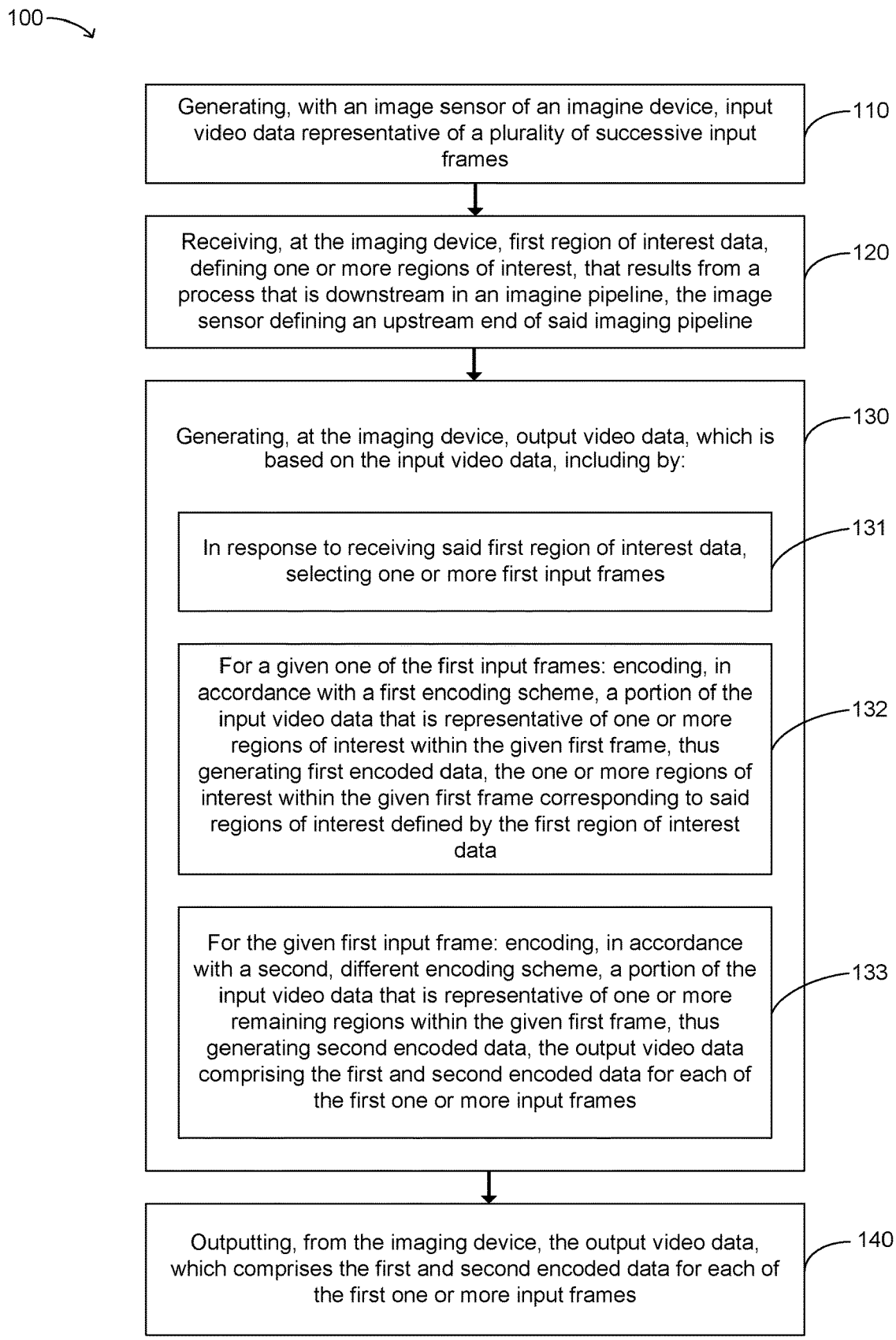
FIG. 1 is a flow diagram showing a method of processing video data according to a first embodiment of the disclosure.

Referring now to the Figures, attention is firstly directed to FIG. 1, which is a flow diagram showing a method of processing video data 100 according to a first embodiment of the disclosure. The method 100 of FIG. 1 may be implemented using a video processing system, such as the video processing system 1 illustrated schematically in FIG. 4 and described below.

Figure 2A:
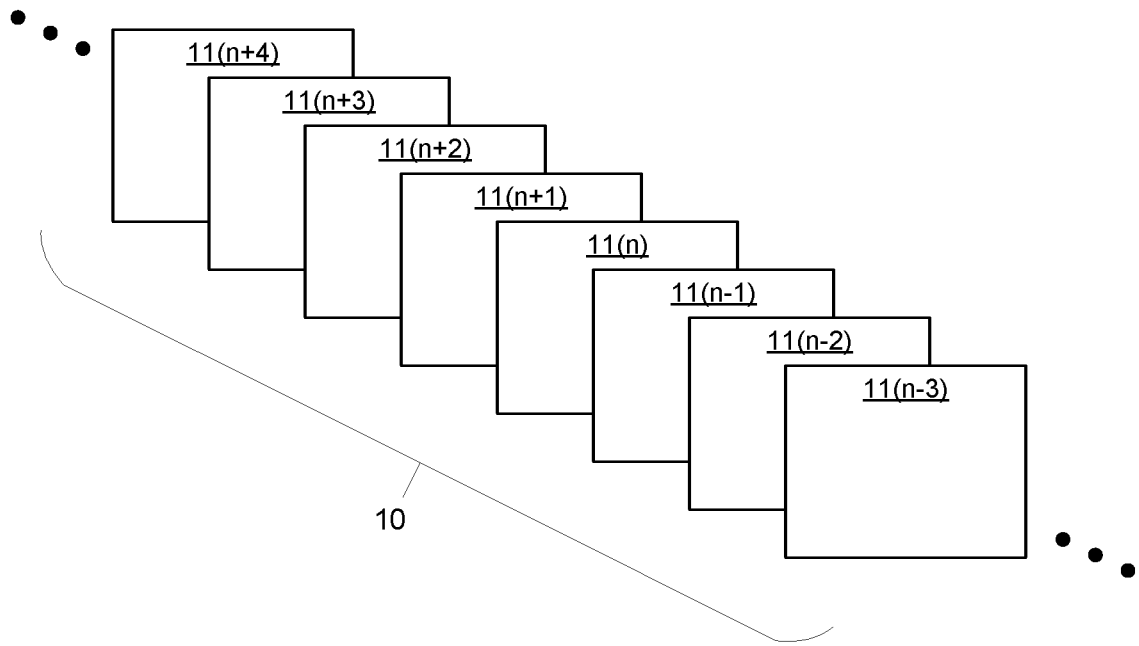
FIGS. 2A-2C are schematic diagrams illustrating features of the method of FIG. 1; is a flow diagram showing an example of a method for classifying regions in a given frame that may be implemented in embodiments of the disclosure.

As shown in FIG. 1, the method 100 includes a step 110 of generating, with an image sensor 51 of an imaging device 50, input video data 10 representative of a plurality of successive input frames 11. FIG. 2A illustrates such input video data 10 diagrammatically; the input frames 11 represented in the input video data 10 are shown in the drawing, with individual input frames 11 being identified by suffixes (n−3)-(n+4).

A frame for example corresponds to a still image. A series or sequence of such frames, which typically represent a series of sequential images, can be considered to correspond to a video or a moving picture. A frame generally includes a plurality of pixels, for example disposed in a rectangular array.

The frames 11 may be represented in the input video data 10 in any suitable format, such as a raw image format.

The imaging device 50 may, for example, be a camera, it being understood that the term "camera" does not imply a limitation to visible light: an imaging device configured to detect other wavelengths (e.g. by employing a suitable image sensor), such as infra-red, ultraviolet, X-rays etc. might equally be referred to as a "camera". More broadly, it is envisaged that the imaging device need not be configured such that each frame represents an intensity pattern for electromagnetic radiation; rather, the imaging device might be configured such that each frame represents, for example, depth/distance from the device.

As discussed in more detail below with reference to FIG. 4, an image sensor 51 typically includes an array of sensor pixels, which may be any suitable sensors for capturing images, such as photosensors.

As also shown in FIG. 1, the method further includes a step 120 that includes receiving, at the imaging device 50, first region of interest data, defining one or more regions of interest. This first region of interest data may, for example, define such regions of interest with respect to a notional frame, e.g. one having the same dimensions and/or resolution as each of the input frames 11.

The region of interest data may define the one or more regions of interest of a frame in any suitable manner. For instance, it might indicate one or more regions that belong to a predefined regular array of regions that completely covers the frame. Region of interest data in such a format may have relatively small size.

Figure 2B:
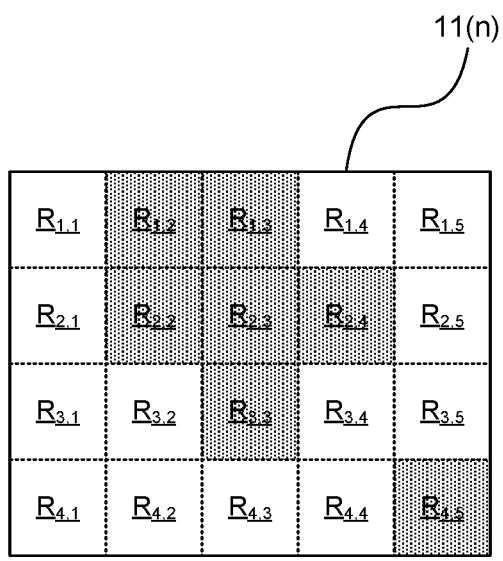

As illustrated in FIG. 2B, such a predefined array may for example be a two-dimensional array. In the particular case depicted in FIG. 2B, the regions of interest $R_{1,2}$, $R_{1,3}$, $R_{2,2}$, $R_{2,3}$, $R_{2,4}$, $R_{3,3}$, and $R_{4,5}$ have all been indicated by the region of interest data. Each region in such a predefined array will typically be made up of a number of pixels (which may for example be the same for all regions) and may, for example, be a block or tile of a frame, for instance having rectangular shape, as also illustrated in FIG. 2B. As shown, the predefined array regions may have a tessellating arrangement that completely covers the frame; for example, the regions may be arranged in a rectangular array (and may also themselves be rectangular), as also illustrated in FIG. 2B.

Figure 2C:
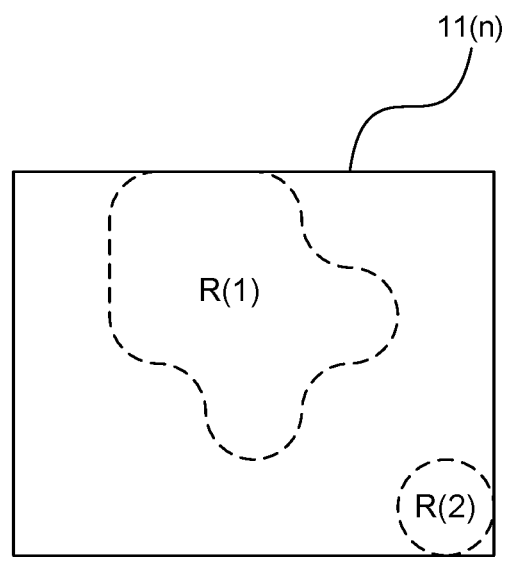

In other embodiments, the region of interest data may define the one or more regions of interest in a different manner. For instance, the region of interest data could define a boundary for each region of interest R(1), R(2), as shown in FIG. 2C. For example, the data might define parameters for curved or straight lines, each of which is a segment of such a boundary, or it might identify specific pixels forming such a boundary.

The region of interest data may originate or result from various processes external to the imaging device 50. Such processes might, for example, run on a computing system 200 that is in data communication with the imaging device 50 by means of a data exchange interface 70, as is illustrated in FIG. 4.

In some embodiments, the first region of interest data may result from a process that is downstream in an imaging pipeline 500.

An imaging pipeline 500 may for example comprise a series of video processing operations or processes that act sequentially on the video data produced by the image sensor 52 in a defined order. Hence (or otherwise), the image 52 sensor may define an upstream end of such an imaging pipeline 500.

Figure 3A:
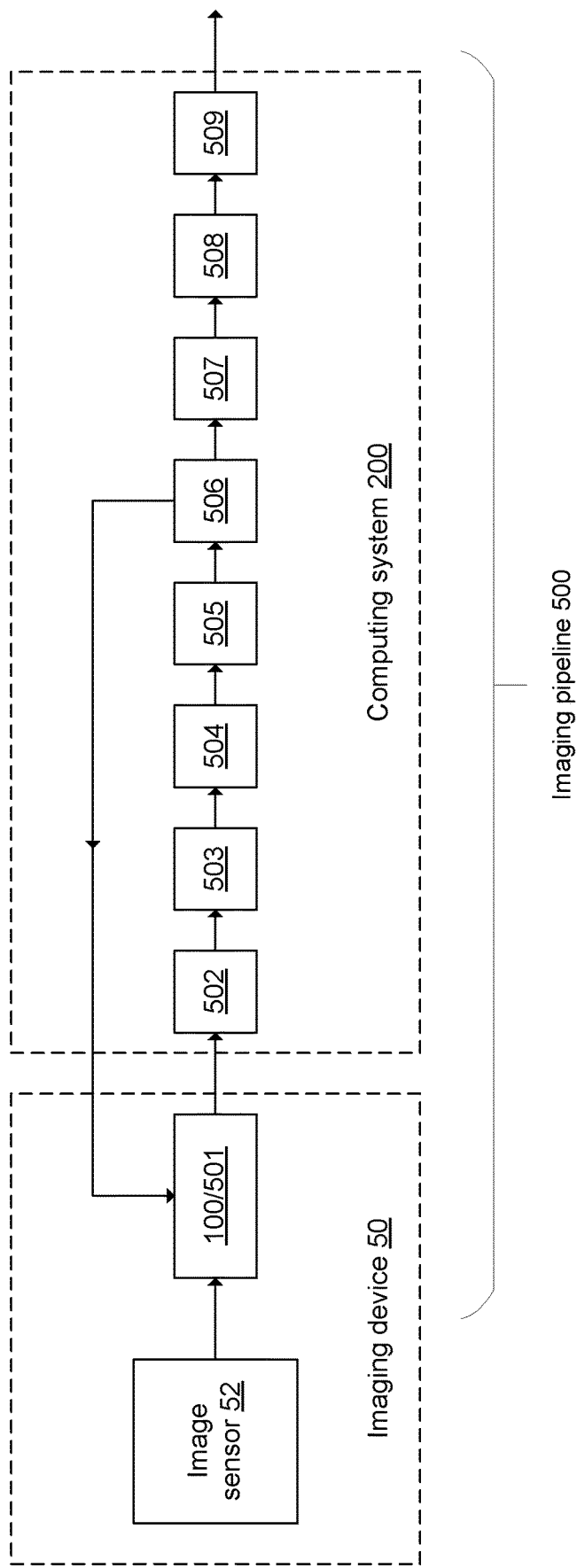
FIGS. 3A-3B are schematic diagrams illustrating examples of an imaging pipeline.

An example of the method 100 of FIG. 1 interacting with such an imaging pipeline 500 is shown schematically in FIG. 3A. As may be seen, the imaging pipeline 500 in the example shown comprises a series of modules 501-509, each of which carries out a corresponding process. As indicated in FIG. 3A, encoding module 501 carries out the steps of method 100.

As is apparent from FIG. 3A, video data originates at the image sensor 52, the upstream end of the imaging pipeline 500, and flows in a downstream direction, being processed by each module 501-509 in turn. As indicated by the arrows connecting the modules 501-509, the data output from each module is used as an input for the next module in the series.

As shown, the encoding module 501, which carried out method 100, may be the first module in the series. In some embodiments, therefore, the steps of method 100 may be carried out on the raw data output from the image sensor 52. However, this is by no means essential and in other examples the imaging pipeline 500 could include some additional module(s) between the sensor 52 and encoding module 501, for instance to carry out pre-processing of data.

As also shown, the imaging pipeline 500 includes several modules 502-509 that are downstream of encoding module 501 within the imaging pipeline 500. While the drawing shows only eight modules downstream of encoding module 501, it should be understood that this is merely for the sake of clarity and in practice the pipeline 500 might include considerably more modules. (Conversely, in some cases, the pipeline 500 could include fewer modules).

The downstream modules 502-509 may carry out various operations. For example, the relatively more upstream of these modules 502-509 may carry out initial video processing operations, such as demosaicing, saturation correction, renormalization and/or white balance adjustment, spatial and/or temporal filtering; the relatively more downstream modules, by contrast, may carry out more complex operations on the video data flowing through the pipeline 500, such as an computer vision operations (e.g. object recognition, feature detection, video tracking and the like), or simultaneous localization and mapping (SLAM).

FIG. 3A also shows, by way of an arrow connecting module 506 to encoding module 501, that output data from module 506 is sent to encoding module 501. In the illustrated example shown in FIG. 3A, the output data from module 506 implicitly acts as region of interest data. Thus, in the illustrated example the region of interest data received by encoding module 501 may be said to have directly resulted from the process of module 506. In the example of FIG. 3A, the module 506 might, for instance, carry out an object recognition process. Such an object recognition process may inherently generate data that defines portions of each frame where one or more objects of interest have been detected. It will be understood that such data may implicitly define regions of interest within a frame.

As a further example, the output from a computer vision process may inherently generate region of interest data, by determining portions of each frame where objects or features are identified or "seen". It is envisaged that, in certain embodiments, a computer vision algorithm may be utilized that has been trained using image data representing one or more images (e.g. frames of a video or still images), and gaze direction data for users viewing such images. Such a computer vision algorithm may thus be trained to emulate a user in perceiving regions of interest in images. Nonetheless, care may need to be taken to ensure that the computer vision algorithm does not replicate certain movements that are peculiar to the human eye, such as movements to scan objects with greater apparent size than the fovea, or movements to relieve saturation of the cortical neurons following prolonged fixation on a particular point. This might, for example, be accomplished by suitable pre-processing of the gaze direction data. Such a computer vision algorithm might, for example, include an artificial neural network (e.g. a convolutional neural network) or a support vector machine.

While not shown in the simplified illustration of FIG. 3A, it should be understood that processes such as computer vision or object recognition may receive data that is additional to the video data flowing through the imaging pipeline 500. In particular, they might receive context information regarding the current frames of video. Such context information may allow certain object types to be prioritized as regions of interest over others; for example, if the context information indicated "cats", then objects identified as cats might be prioritized as regions of interest.

Figure 3B:
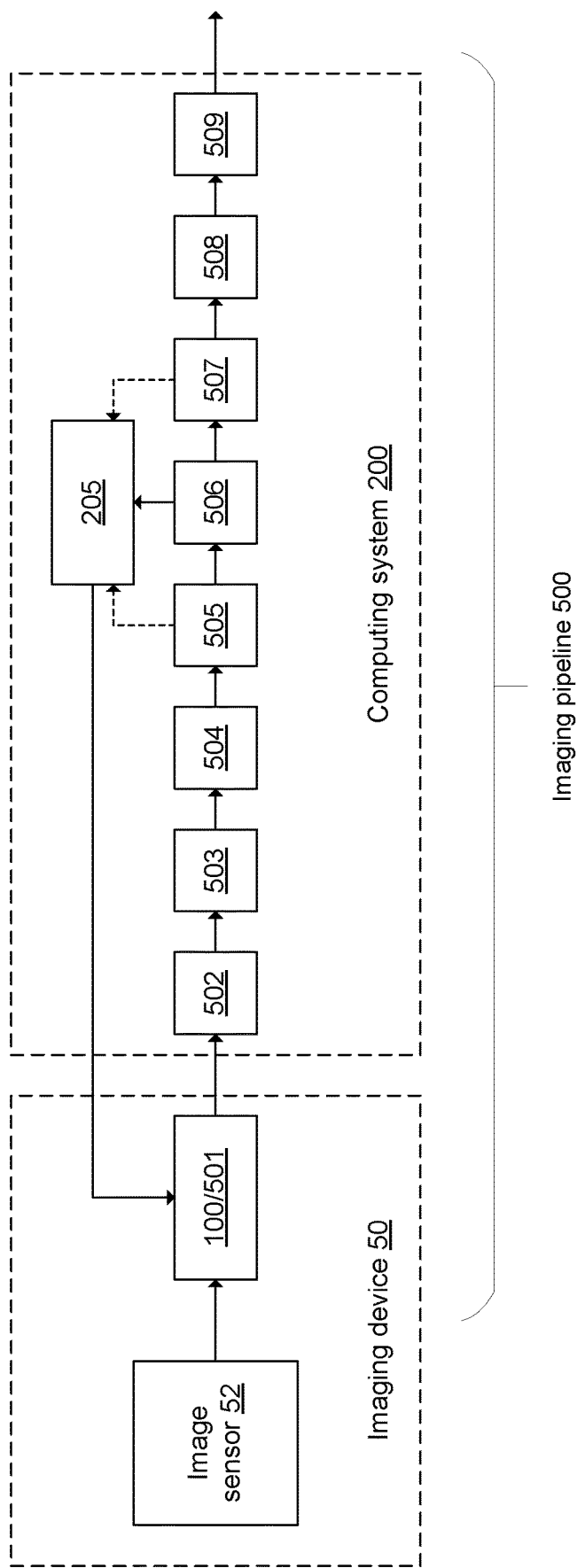

FIG. 3B shows a further example of the method 100 of FIG. 1 interacting with an imaging pipeline 500. This imaging pipeline 500 is essentially the same as that shown in FIG. 3A; however, in contrast to FIG. 3A, in the example of FIG. 3B, output data from module 506 is sent to an additional processing module 205, which does not form part of the pipeline 500.

This additional processing module 205 may carry out a number of operations on the output data from module 506, thereby generating region of interest data, which it sends to the encoding module 501. For example, additional processing module 205 might just carry out simple formatting of the output data from module 506; however, in other examples it may carry out more complex operations, for instance using further input data, such as user input data and/or sensor input data (from sensors other than image sensor 52, e.g. motion sensors). Indeed, in some examples additional processing module 205 might form part of application software or operating system for the computing system.

Furthermore, as indicated by dashed arrows extending from modules 505 and 507 respectively to additional processing module 205, the additional processing module 205 may, in some examples, generate region of interest data that is derived from output data from multiple modules.

In some embodiments, because the region of interest data result from a process that is downstream in the imaging pipeline, relative to the generation of output video data in step 130, the region of interest data are generated based on video data corresponding to earlier frames than those in respect of which output video data is being generated by encoding module 501. In generating the region of interest data, a motion estimation process may therefore be utilized, for example by additional processing module 205. This may assist in estimating which regions are of interest in the frames being processed by the encoding module 501. Such motion estimation may, for example, be based on the video data being processed by the downstream module, such as module 505 in FIGS. 3A and 3B, which typically corresponds to earlier frames. For example, a number of earlier frames may be analyzed, to determine the motion of objects and/or features in the video data, with regions of interest within the current input frame(s) being generated in response.

Alternatively, or in addition, such motion estimation may be based on imaging device motion data that is, for example, representative of motion by the imaging device (e.g. representative of translations and/or rotations of the imaging device) and that may have been generated by suitable motion sensors, such as accelerometers, gyro sensors, magnetometers, etc.

For instance, referring to FIGS. 2A and 3B, if encoding module 501 is generating output video data corresponding to frame 11(n), module 505 may be carrying out objection detection (for example) on video data within the imaging pipeline that corresponds to frame 11(n−3). If, for example, module 505 detects a red ball in video data corresponding to frame 11(n−3), it may not be the case that the red ball will appear in exactly the same location within frame 11(n). Accordingly, additional processing module 205 may utilize a motion estimation process to estimate where in frame 11(n) the red ball will be, and may generate region of interest data based on this estimated location.

Of course, such motion estimation is by no means essential. For example, relatively larger regions of interest might be designated, so as to allow for motion of features or objects within the frames of the video data.

While FIGS. 3A and 3B illustrate only a single encoding module 501, this is not limiting and in other examples any suitable number of modules might carry out the steps of method 100.

Furthermore, while FIGS. 3A and 3B show region of interest data as being derived from output data from module 506 in particular, this is merely for the purposes of illustration; it will be understood that region of interest data may be derived from any of modules 502-509 (or groups thereof) as is appropriate for a particular implementation.

Still further, while FIG. 3B illustrates only a single additional processing module 205, this is not limiting and in other examples any suitable number of additional processing modules could be utilized to generate region of interest data resulting from any of modules 502-509 (or groups thereof) as is appropriate for a particular implementation.

As indicated using dashed boxes in FIGS. 3A and 3B, the downstream modules 502-509 in the imaging pipeline may be implemented on a computer system 200 (e.g. on one or more processors thereof), whereas the module carrying out method 100 may be implemented on the imaging device 50 (e.g. on one or more sensor data processors 52 thereof). However, this is merely illustrative, and the modules 501-509 may be implemented on any suitable hardware.

While in the examples described above with reference to FIGS. 3A and 3B the first region of interest data result from a process that is downstream in an imaging pipeline 500, it should be understood that this is by no means essential. As an example, the region of interest data might result from a gaze tracking algorithm, which for example acts on video data generated by a camera directed towards a user's eyes. In some embodiments, the output from a gaze tracking algorithm may implicitly act as region of interest data, since the output data from such an algorithm may define locations (and therefore regions) within a frame that a user's gaze is directed at. As a further example, the region of interest data might be generated by an application running on processor(s) 210, 220, 230 forming part of a computing system 200 in data communication with the imaging device 50, without involvement of any output data from the imaging pipeline.

Attention is again directed to FIG. 1, which further shows method step 130 of generating, at the imaging device 50, output video data, which is based on the input video data. As will be appreciated from the discussion below, the output video data is additionally based on the region of interest data that was received in step 120.

As shown by FIG. 1, step 130 includes sub-step 131 of, in response to receiving the first region of interest data, selecting one or more first input frames. The input data corresponding to the thus-selected first frames are processed further in sub-steps 132 and 133.

In some embodiments, following receipt of the first region of interest data, substantially every input frame received thereafter will be selected in sub-step 131.

Alternatively, following receipt of the first region of interest data, only some of the input frames received thereafter may be selected in sub-step 131; for example, input frames may be selected at a frequency that is dependent upon (e.g. positively related to) a total magnitude (e.g. a total area, or a weighted sum) of the one or more regions of interest defined in the region of interest data that were received in step 120. This may enable a data rate at which the output video data is output in step 130 to be decreased in response to first region of input data that indicates there is little or nothing of interest in the input frames.

The input data corresponding to the unselected frames may be discarded, for example with no output video data being generated based on it. Furthermore, the output video data may include data indicating such unselected or dropped frames (but not defining their content). Such dropped frame data may assist with processes downstream in the imaging pipeline 500.

Having selected one or more first input frames in sub-step 131, the input video data for each such first frame is processed in sub-steps 132 and 133.

Specifically, sub-step 132 involves, for a given one of the first input frames: encoding, in accordance with a first encoding scheme, a portion of the input video data that is representative of one or more regions of interest within the given first frame, thus generating first encoded data. As indicated, the regions of interests within the given first frame correspond to the regions of interest defined by the first region of interest data. For instance, the regions of interest within the given first frame may be the result of applying the regions of interest defined in the first region of interest data to the given first frame. For example, where the first region of interest data define regions of interest with respect to a notional frame, this might include scaling those regions of interest based on the size of the given frame, relative to the notional frame.

Turning next to sub-step 133, this involves, for the given first frame: encoding, in accordance with a second, different encoding scheme, a portion of the input video data that is representative of one or more remaining regions within the given first frame, thus generating second encoded data. In some embodiments, the regions of interest and the one or more remaining regions might therefore be described as completely covering the given frame.

Because different encoding schemes are used, each encoding scheme may be tailored for its corresponding region type, i.e. regions of interest, or remaining regions. Furthermore, the data for the portions of the frame that have greater significance for downstream processes—the regions of interest—can be encoded according to a convenient scheme for such downstream processes, with the remaining regions being encoded using a different scheme, appropriate to their lower significance.

For instance, the first encoded data, which are representative of the regions of interest may be encoded at a higher quality level (in some respect). Specifically, the "quality" of the first encoded data may, in some cases, be higher in a manner which is useful to the downstream process in the imaging pipeline 500 whose output data was used to generate the region of interest data.

In a straightforward example of a method having different first and second encoding schemes, the first encoding scheme (that used for the regions of interest) may have a lower compression loss rate than the second encoding scheme (that used for the remaining regions). Thus, such embodiments may be described as losing a greater amount of image information for the regions of interest than for the remaining regions. In some cases, the compression loss rate for the first encoding scheme may be zero, with the first encoded data, which are representative of the regions of interest, being compressed losslessly or being essentially uncompressed.

In such an example, the higher quality for the regions of interest (in terms of their lower compression) may assist downstream processes within the imaging pipeline, such as computer vision processes (e.g. object recognition, feature detection, video tracking and the like), or simultaneous localization and mapping processes. In particular, it may assist downstream processes whose output data was used to generate the region of interest data and to thereby designate the regions of interest.

On the other hand, the greater compression loss rate for the data of the remaining regions (the second encoded date) typically results in the output video data as a whole consuming less bandwidth.

In a further example, a chrominance compression loss rate for the first encoding scheme (that used for the regions of interest) may be lower than a chrominance compression loss rate for the second encoding scheme (that used for the remaining regions). A chrominance compression loss rate is for example the compression loss rate for the chrominance channels of a frame (e.g. for the U and V channels in a YUV color scheme). Thus, such embodiments may be described as losing a greater amount of chrominance or color information for the regions of interest than for the remaining regions.

The fovea of the human eye is significantly more sensitive to color that other parts of the eye. Therefore, with appropriately determined regions of interest (e.g. corresponding to fixation points of a user's eyes), a compressed version of the input video data may be generated (i.e. the output video data) that has little or no perceptible loss of quality.

Furthermore, the greater amount of chrominance information for the regions of interest may assist downstream processes within the imaging pipeline, such as computer vision processes (e.g. object recognition, feature detection, video tracking and the like), or simultaneous localization and mapping processes. In particular, it may assist downstream processes whose output data was used to generate the region of interest data and to thereby designate the regions of interest.

With embodiments having a lower chrominance compression loss rate for the first encoding scheme than for the second encoding scheme, the chrominance compression loss rate for the first encoding scheme may in some cases be zero. In such cases, chrominance data corresponding to the regions of interest may, for example, be compressed losslessly or might be uncompressed.

Furthermore, with such embodiments, the overall compression loss rate for the first encoding scheme may be lower than the overall compression loss rate for the second encoding scheme; however, this need not be the case and, for example, the overall compression loss rates might be essentially equal.

Alternatively, or additionally, a luminance compression loss rate for the first encoding scheme may be lower than a luminance compression loss rate for the second encoding scheme. A luminance compression loss rate is for example the compression loss rate for the luminance channels of a frame (e.g. for the Y channel in a YUV color scheme).

In still further examples, a spatial resolution for the first encoding scheme (that used for the regions of interest) may be higher than a spatial resolution for the second encoding scheme (that used for the remaining regions). The greater spatial resolution for the regions of interest may, for example, assist in their processing by downstream processes in the imaging pipeline, such as computer vision processes (e.g. object recognition, feature detection, video tracking and the like), or simultaneous localization and mapping processes. In particular, it may assist downstream processes whose output data was used to generate the region of interest data and to thereby designate the regions of interest.

On the other hand, the lower spatial resolution for the data of the remaining regions (the second encoded data) typically results in the output video data as a whole consuming less bandwidth.

In yet further examples, a dynamic range for the first encoding scheme may be higher than a dynamic range for the second encoding scheme. The greater dynamic range for the regions of interest may, for example, assist in their processing by downstream processes in the imaging pipeline, such as computer vision processes (e.g. object recognition, feature detection, video tracking and the like), or simultaneous localization and mapping processes. In particular, it may assist downstream processes whose output data was used to generate the region of interest data and to thereby designate the regions of interest.

On the other hand, the lower dynamic range for the data of the remaining regions (the second encoded data) typically results in the output video data as a whole consuming less bandwidth.

In another class of examples, the first encoding process may have a greater computational complexity than the second encoding process. This may, in some cases, result in more processing time being spent on the regions of interest than on the remaining regions, on a per-pixel basis. As a result, processing resources may be used more efficiently.

As an example, the first encoding process may include spatial and/or temporal filtering processes and the second encoding process may either include less computationally complex spatial and/or temporal filtering processes (e.g. that act on a smaller number of comparison pixels or comparison frames), or may include no spatial or temporal filtering.

In yet another example of a method having different first and second encoding schemes, the second encoding scheme may generate null data, or zero-bits of data, in respect of a sub-group of the first frames. For instance, null data (or zero bit data) might be generated in respect of every nth first frame (where n>1). Such an example might be described as having a lower update frequency for the remaining regions of each frame, in comparison to the regions of interest. A method according to such an example typically results in output video data that as a whole consumes less bandwidth, with relatively little or no impact upon the quality of the first encoded data.

It should be appreciated that this example may be combined with any of the above examples. In particular, the second encoding scheme may be such that for frames not belonging to the sub-group described above, it generates non-null second encoded data of lower quality than the corresponding first encoded data, in a manner described above. For instance, the second encoded data might have a lower spatial resolution.

Attention is directed once more to FIG. 1, which shows further method step 140 of outputting, from the imaging device, the output video data. As noted above, sub-steps 132 and 133 are carried out for each of the first frames that were selected in step 131. Consequently, corresponding first and second encoded data is generated for each of the first frame.

As indicated in box 140 in FIG. 1, the output video data comprise such first and second encoded data for each of the first input frames.

Furthermore, in some embodiments, the output video data may comprise data additional to the first and second encoded data generated in sub-steps 132 and 133.

As one example, the output video data may comprise data that indicates the regions of interest within each of the first frames (which were selected in sub-step 131). For instance, where the regions of interest belong to a predefined regular array of regions that completely covers each frame (as described above with reference to FIG. 2B), such data may indicate which regions within the regular array are regions of interest. In other examples, such data could define a boundary for each region of interest (e.g. as described above with reference to FIG. 2C).

It should further be appreciated that the output video data may be in one of several formats.

For example, for a portion of output video data corresponding to a given first frame, the first encoded data for the frame might be entirely separate from the second encoded data. Where the output video data includes data that indicates the regions of interest within each of the first frames, such data may also be separate from the first and second encoded data. For instance, a portion of output video data corresponding to a given first frame may include a header that includes such data indicating the regions of interest in the frame.

In a further example, where the regions of interest belong to a predefined regular array of regions that completely covers each frame (as described above with reference to FIG. 2B), the output video data corresponding to a given first frame may include respective portions of data for the regions of the frame, with such portions being in a predefined order (e.g. starting from the top row of regions and continuing downwards through the rows in order, each row may be written out from left to right). Where the output video data includes data that indicates the regions of interest within each of the first frames, such data may form part of a header for a portion of output video data corresponding to the first frame in question. Alternatively, each portion of region data may have data appended to it (e.g. as a header) that indicates whether that region is a region of interest.

In addition, it should be appreciated that the methods described above with reference to FIGS. 1-3B may include further steps.

In particular, method 100 may include a further step of receiving second region of interest data, which also results from a process that is downstream in the imaging pipeline, for instance the same process whose output data was used to generate the first region of interest data. In addition, the method may include additional sub-steps for step 130 that are similar to sub-steps 131-133, but which utilize the second region of interest data in place of the first input data.

In some embodiments, sub-steps 131-133 may be carried until such second region of interest data is received, whereupon the corresponding sub-steps based on the second region of interest data may be carried out.

In other embodiments, rather than simply carrying out sub-steps 131-133 continually until second region of interest data is received, these sub-steps might instead be carried out for only a given period of time, or a given number of frames (unless second region of interest data is received sooner). Hence (or otherwise), step 130 may, in some embodiments, include a sub-step of, in response to receiving no region of interest data within a predetermined time interval, generating reduced frame-rate output data. Such reduced frame-rate output data is for example representative of only a fraction of the input frames that are represented by the input video data that is received subsequent to the predetermined time interval. This will typically result in the outputting of the output video data using less bandwidth where no region of interest data is received within the predetermined time interval. Such a sub-step might be described as switching to a low frame rate/low bandwidth mode, in response to no region of interest data being received.

Figure 4:
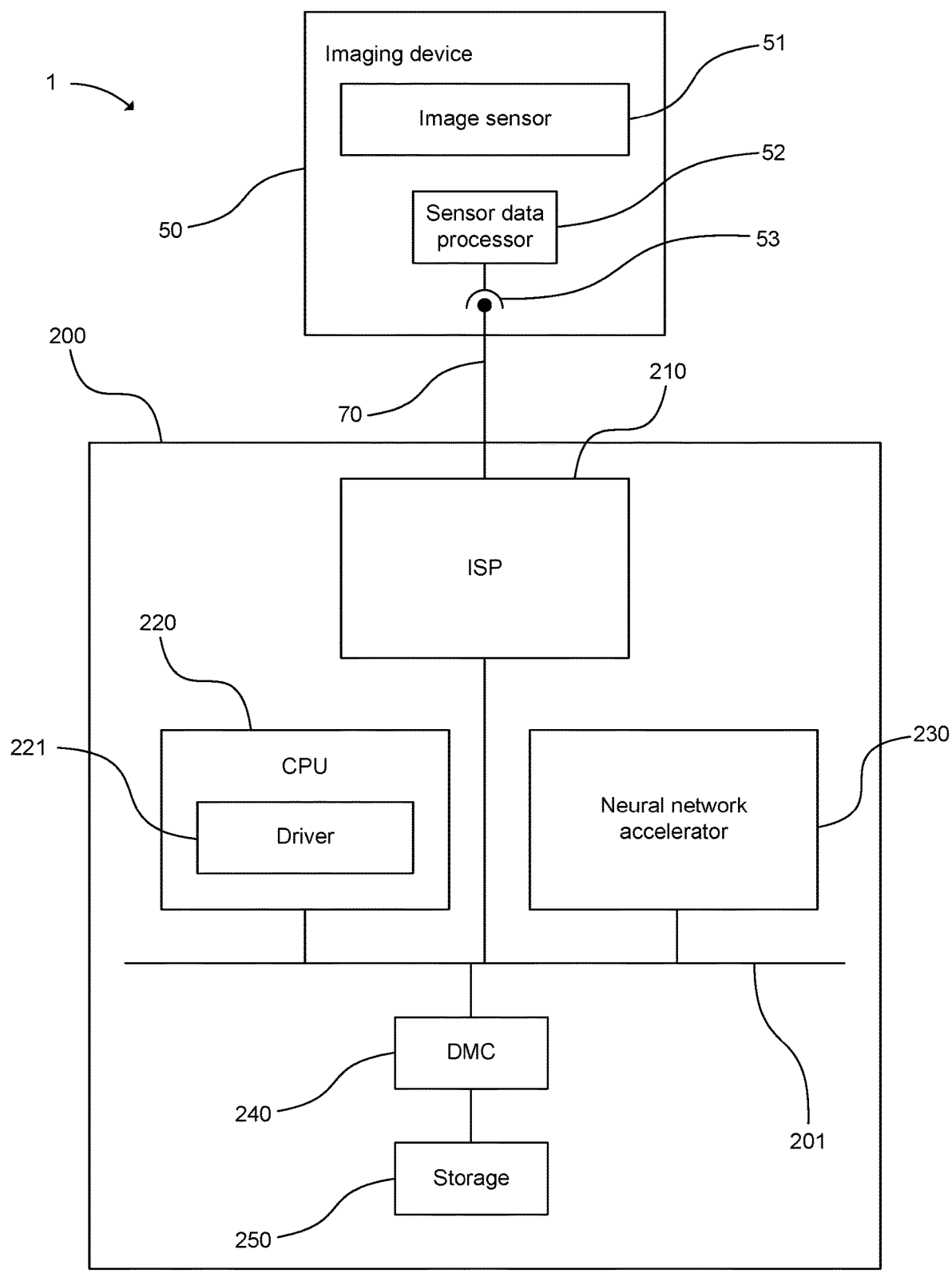
FIG. 4 is a schematic diagram illustrating internal components of a video processing system according to an embodiment of this disclosure.

Attention is next directed to FIG. 4, which shows schematically an example of a video processing system 1 according to an embodiment of this disclosure.

The video processing system 1 of FIG. 4 may be coupled to, or form part of, a computer device, such as a personal computer, a laptop, a smartphone or an on-board computer device which may be coupled to or mounted within a vehicle such as a car.

As shown in FIG. 4, the video processing system 1 includes an imaging device 50, which in turn includes an image sensor 51 and a sensor data processor 52, and a computing system 200, which will be described in further detail below, that includes one or more processors. As shown, the imaging device 50 and the computing system 200 are in data communication by means of data exchange interface 70 (which is, for example, a camera serial interface CSI, or an adapted version thereof). As also shown, the imaging device 50 includes a connector 53, which is connectable to the computing system 200 in order to provide this data exchange interface 70.

While FIG. 4 shows the image sensor 51 and sensor data processor 52 as separate boxes, it should be understood that these may be provided within the same component, such as a suitable integrated circuit. Furthermore, although the imaging device 50 is shown as including only one sensor data processor 52, it should be understood that, the sensor module 50 might include several sensor data processors. Furthermore, depending on the particular application, the imaging device may include various additional components. For example, where the imaging device 50 is configured as a camera, it may include one or more lenses.

An image sensor 51 typically includes an array of sensor pixels, which may be any suitable sensors for capturing images, such as photosensors. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 51 in this example is arranged to capture video data, which may be in the form of a series of images captured sequentially, with each image corresponding to a frame of the video.

The sensor data processor 52 may be configured (e.g. by suitable programming) to carry out the methods described above with reference to FIGS. 1-3B.

Specifically, sensor data processor 52 may carry out all of the steps 110-130 of method 100 shown in FIG. 1. For instance, it may receive input video data representative of a plurality of successive input frames from image sensor 51, for example as described above with reference to step 110.

Furthermore, sensor data processor 52 may receive region of interest data, for example as described above with reference to step 120. As described above with reference to FIGS. 3A and 3B, in some embodiments, the region of interest data results from a process that is downstream in an imaging pipeline relative to the generating of output video data (in step 130). In other embodiments, the video processing system 1 of FIG. 4 may utilize region of interest data that has not necessarily resulted from a process in such an imaging pipeline. As an example, the region of interest data might result from a gaze tracking algorithm running on the processor(s) 210, 220, 230 of the computing system 200 (it being noted that, in some cases, such a gaze tracking algorithm may form part of a separate imaging pipeline for data generated by a camera directed towards a user's eyes). As a further example, the region of interest data might be generated by an application running on the processor(s) 210, 220, 230 of the computing system 200 without involvement of any output data from the imaging pipeline. Indeed, the sensor data processor 52 may utilize any suitable region of interest data that it receives, from the processor(s) 210, 220, 230 of the computing system 200, via the data exchange interface 70.

Still further, sensor data processor 52 may generate and output, via the data exchange interface 70, output video data. Such output video data is based on the input video data received from the image sensor 51, and is further based on the region of interest data received from the processor(s) 210, 220, 230 of the computing system 200, via the data exchange interface 70.

In this way, output video data may be generated based on the regions of interest designated by the region of interest data sent by the computing system 200, prior to sending such output video data to the computing system 200. This enables data to be suitably encoded at a relatively early stage, potentially resulting in the overall video processing system 1 operating in a computationally and/or energy efficient manner. For example, energy expended in transferring data from the imaging device 50 to the computing system 200 may be reduced. Transferring video data from the imaging device 50 to the computing system 200 may, in some cases, be energy intensive, especially with high frequency and/or high definition video.

Where it is intended that the sensor data processor 52 will generate output video data based on region of interest data in a manner described above (e.g. by carrying out a method as described with reference to FIGS. 1-3B), the one or more processors within the computing system 200, such the CPU 220, may program the sensor data processor 52 to be suitable for carrying out such methods, for instance by updating the programming of the sensor data processor 52 so that it can output the output video data over data exchange interface 70. For example, the sensor data processor 52 might be programmed with suitable data formats and/or communication protocols (e.g. an extended version of the Camera Serial Interface). In certain cases, the CPU 220 might suitably program the ISP 210, which in turn programs the sensor data processor 52 as described. Data may also be sent from the sensor data processor 52 to the ISP as part of the configuration process. With such approaches, a standard imaging device 50 may be configured by a suitably programmed CPU 220 to generate output video data based on region of interest data carry as described herein (e.g. by carrying out a method as described above with reference to FIGS. 1-3B).

In FIG. 4, the image sensor module 50 is arranged to transfer video data to an image signal processor (ISP) 210 of a computing system 200 via data exchange interface 70. The ISP 210 may perform initial processing of video data to prepare the video for display. For example, the ISP 210 may perform demosaicing, saturation correction, renormalization and/or white balance adjustment, spatial and/or temporal filtering, although this is not to be taken as limiting. In the particular architecture shown in FIG. 4, CPU 220 is connected to the data exchange interface 70 via ISP 210; however, various alternative architectures may be employed in other embodiments.

As shown, the computing system 200 of FIG. 4 includes several processors; however, in general, suitable computing systems may include one or more processors. In the particular example shown in FIG. 4, the processors of the computing system 200 include a central processor unit (CPU) 220, and a convolutional neural network (CNN) accelerator 230, which is a processor dedicated to implementing processing of data, including feature detection. As such, it will be appreciated that various modules within the imaging pipeline 500 discussed above with reference to FIGS. 3A and 3B may be implemented on such a CNN accelerator 230. In particular, where used, the computer vision algorithm detailed above that is trained using image data and gaze direction data for users viewing images represented in said image data might be implemented on such a CNN accelerator.

Nonetheless, various modules within the imaging pipeline 500 may also be implemented on CPU 220. In the particular architecture shown in FIG. 4, the CNN accelerator 230 is connected to the ISP 210 via the CPU 220; however, various alternative architectures may be employed in other embodiments.

In other examples, however, feature detection operations may be implemented using a more general processor, such as a GPU, or the CPU 220, in which case the CPU 220 might be the sole processor within the computer system 200.

In still other examples, the computing system 200 may include additional or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system 200 may also or alternatively include a processor implemented as a combination of computing devices, e.g., a combination of a DSP and a microprocessor, a plurality of microprocessors, one or more microprocessors in conjunction with a DSP core, or any other such configuration. The computing system may also or alternatively include at least one graphics processing unit (GPU).

The CPU 220 of FIG. 4 includes a driver 221 which for example provides an interface between software configured to control or configure the CNN accelerator 230 and/or other components of the computing system 220. The driver 221 may therefore form part of or correspond to a control system for controlling the operation of the one or more processors.

The computing system 200 of FIG. 4 also includes a dynamic memory controller (DMC) 240 which may be used to control access to storage 250 of the computing system 200. The storage 250 is for example configured to store the video data received from the ISP 210.

The storage 250 is for example external to the neural network accelerator 230 and may be a random-access memory (RAM) such as DDR-SDRAM (double data rate synchronous dynamic random-access memory). In other examples, the storage 250 may be or include a non-volatile memory such as Read Only Memory (ROM) or a solid-state drive (SSD) such as Flash memory. The storage 250 in examples may include further storage devices, for example magnetic, optical or tape media, compact disc (CD), digital versatile disc (DVD) or other data storage media. The storage 250 may be removable or non-removable from the computing system 200. In examples, the CNN accelerator 230 may also include local storage including one or more buffers, which may nevertheless be considered to form part of the storage of the video processing system 200.

The components of the computing system 200 in the example of FIG. 4 are interconnected using a systems bus 201. This allows data to be transferred between the various components. The bus 201 may be or include any suitable interface or bus. For example, an ARM® Advanced Microcontroller Bus Architecture (AMBA®) interface, such as the Advanced eXtensible Interface (AXI), may be used.

It is to be appreciated that the video processing system 1 of FIG. 4 is merely an example and other video processing systems may be used in other examples.

The above examples are to be understood as illustrative examples. Further examples are envisaged.

Furthermore, it is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. Method for processing video data, comprising:
generating, with an image sensor of an imaging device, input video data representative of a plurality of successive input frames;
receiving, at the imaging device, first region of interest data, defining one or more regions of interest;
generating, at the imaging device, output video data, which is based on the input video data, including by:
in response to receiving said first region of interest data, selecting one or more first input frames from the plurality of input frames represented in the input video data; and
for a given one of the selected one or more first input frames:
encoding, in accordance with a first encoding scheme, a portion of the input video data that is representative of one or more regions of interest within the given first frame, thus generating first encoded data, the one or more regions of interest within the given first frame corresponding to said regions of interest defined by the first region of interest data, and
encoding, in accordance with a second, different encoding scheme, a portion of the input video data that is representative of one or more remaining regions within the given first frame, thus generating second encoded data; and
outputting, from the imaging device, said output video data,
wherein the output video data comprises the first and second encoded data for each of the first one or more input frames.

2. The method according to claim 1, wherein a compression loss rate for said first encoding scheme is lower than a compression loss rate for said second encoding scheme.

3. The method according to claim 2, wherein the compression loss rate for the first encoding scheme is zero.

4. The method according to claim 1, wherein a spatial resolution for said first encoding scheme is higher than a spatial resolution for said second encoding scheme.

5. The method according to claim 1, wherein a computational complexity of said first encoding process is greater than a computational complexity of said second encoding process.

6. The method according to claim 1, wherein said first encoding process comprises a first spatial filtering process;
wherein said second encoding process either does not include any spatial filtering processes, or comprises a second spatial filtering process, which has a computational complexity that is lower than a computational complexity for said first spatial filtering process.

7. The method according to claim 1, wherein said first encoding process comprises a first temporal filtering process;
wherein said second encoding process either does not include any temporal filtering processes, or comprises a second temporal filtering process, which has a computational complexity that is lower than a computational complexity for said first temporal filtering process.

8. The method according to claim 1, wherein the selected one or more input frames comprise a group of input frames and wherein said second encoding scheme is such that, for each of a sub-group of the selected group of input frames, the corresponding second encoded data is null data or is zero bits in size.

9. The method according to claim 1, wherein selecting one or more first input frames comprises selecting a plurality of first input frames at a frequency that is dependent upon a total magnitude of the one or more regions of interest defined in said first region of interest data.

10. The method according to claim 1, wherein said generating of the output video data further comprises, in response to receiving no region of interest data within a predetermined time interval, generating reduced frame-rate output data, which is representative of only a fraction of a plurality of input frames represented by a portion of the input video data that is received subsequent to the predetermined time interval; and
wherein the output video data comprises said reduced frame-rate output data.

11. The method according to claim 1, wherein said output video data comprises data indicating the regions of interest within each of the first one or more frames.

12. A method according to claim 1, further comprising receiving second region of interest data, defining one or more regions of interest, which results from a process that is downstream in the imaging pipeline relative to said generating of the output video data;
wherein said generating and outputting of the output video data additionally comprises:
in response to receiving said second region of interest data, selecting one or more second input frames, and
for a given one of the selected one or more second input frames:
encoding, in accordance with a first encoding scheme, a portion of the input video data that is representative of one or more regions of interest within the given selected frame, thus generating first encoded data, the one or more regions of interest within the given second frame corresponding to said regions of interest defined by the second region of interest data, and
encoding, in accordance with a second, different encoding scheme, a portion of the input video data that is representative of one or more remaining regions of interest within the given second frame, thus generating second encoded data; and wherein the output video data further comprises the first and second encoded data for each of the second one or more input frames.

13. The method according to claim 1, wherein said first region of interest data results from a process that is downstream in an imaging pipeline relative to said generating of the output video data, said image sensor defining an upstream end of said imaging pipeline.

14. The method according to claim 13, wherein said imaging pipeline comprises:

an encoding module, which carries out said generating and outputting of output video data, and is implemented on the imaging device; and an image processing module, which is downstream from said encoding module and which generates said first region of interest data;

wherein said image processing module implements at least one of: an object recognition algorithm, a feature detection algorithm, a computer vision algorithm, and a simultaneous localization and mapping algorithm.

15. The method according to claim 14, wherein said image processing module implements a computer vision algorithm that has been trained using image data, representative of one or more images, and gaze direction data for one or more users viewing said one or more images.

16. A video processing system comprising:

an imaging device, which comprises:
an image sensor, which is configured to generate input video data representative of a plurality of successive input frames, at least one sensor data processor, and storage accessible by the at least one sensor data processor;

a computing system, which comprises:
at least one processor, and storage accessible by the at least one sensor data processor; and a data exchange interface, which connects the computing system and the image sensor, wherein instructions are stored on said storage accessible by the at least one sensor data processor that, when executed by the at least one sensor data processor, cause the at least one sensor data processor to:

receive said input video data from the image sensor, receive, from the at least one processor of the computing system, via said data exchange interface, first region of interest data that defines one or more regions of interest, and generate output video data, which is based on the input video data, including by:

in response to receiving said first region of interest data, selecting one or more input frames, and, for a given one of the selected one or more of input frames:

encoding, in accordance with a first encoding scheme, a portion of the input video data that is representative of one or more regions of interest within the given selected frame, thus generating first encoded data, the one or more regions of interest within the given selected frame corresponding to said regions of interest defined by the first region of interest data, and encoding, in accordance with a second, different encoding scheme, a portion of the input video data that is representative of one or more remaining regions of interest within the selected frame in question, thus generating second encoded data, output said output video data to the computing system, via said data exchange interface.

17. A video processing system according to claim 16, wherein said data exchange interface is a camera serial interface.

18. A video processing system according to claim 16, wherein the at least one processor of the computing system comprises an image signal processor and a central processor unit; and wherein the central processor unit is connected to said data exchange interface via an image signal processor.

19. A video processing system according to claim 16, wherein the at least one processor of the computing system further comprises a convolutional neural network accelerator, which is connected to said image signal processor via said central processing unit.

20. An imaging device, which comprises:

an image sensor, which is configured to generate input video data representative of a plurality of successive input frames;

at least one sensor data processor;

storage accessible by the at least one sensor data processor; and at least one connector connectable to a computing system, so as to provide a data exchange interface therebetween;

wherein instructions are stored on said storage accessible by the at least one sensor data processor that, when executed by the at least one sensor data processor, cause the at least one sensor data processor to:

receive said input video data from the image sensor, receive, from the at least one processor of the computing system, via said at least one connector, first region of interest data that defines one or more regions of interest, and generate output video data, which is based on the input video data, including by:

in response to receiving said first region of interest data, selecting one or more input frames, and for a given one of the selected one or more of input frames:

encoding, in accordance with a first encoding scheme, a portion of the input video data that is representative of one or more regions of interest within the given selected frame, thus generating first encoded data, the one or more regions of interest within the given selected frame corresponding to said regions of interest defined by the first region of interest data, and encoding, in accordance with a second, different encoding scheme, a portion of the input video data that is representative of one or more remaining regions of interest within the selected frame in question, thus generating second encoded data, output said output video data to the computing system, via said at least one connector.

* * * * *